(12) United States Patent
Shuey

(10) Patent No.: US 7,073,754 B2
(45) Date of Patent: Jul. 11, 2006

(54) CABLE SUPPORT SYSTEMS

(75) Inventor: Alan B. Shuey, Monongahela, PA (US)

(73) Assignee: Ductmate Industries, Inc., East Monogahela, PA (US)

( * ) Notice: Subject to any disclaimer, the term of this patent is extended or adjusted under 35 U.S.C. 154(b) by 214 days.

(21) Appl. No.: 10/085,543

(22) Filed: Feb. 28, 2002

(65) Prior Publication Data
US 2003/0160137 A1 Aug. 28, 2003

(51) Int. Cl.
F16L 3/24 (2006.01)

(52) U.S. Cl. .......................................... 248/72; 248/328
(58) Field of Classification Search .................... 248/58, 248/60, 63, 72, 317, 328, 323; 294/74; 24/136 R, 24/136 L, 136 A, 136 B, 115 L, 115 M
See application file for complete search history.

(56) References Cited

U.S. PATENT DOCUMENTS

| 823,594 | A | * | 6/1906 | Frazee | 403/71 |
| 1,959,985 | A | | 5/1934 | Moll | |
| 2,564,389 | A | * | 8/1951 | Boehm et al. | 43/55 |
| 2,664,113 | A | * | 12/1953 | Dodge | 139/100 |
| 3,069,738 | A | * | 12/1962 | Nelson | 294/82.23 |
| 3,321,161 | A | * | 5/1967 | Hirt | 248/72 |
| 3,979,094 | A | | 9/1976 | DeWitt | |
| 4,019,705 | A | * | 4/1977 | Habuda et al. | 248/58 |
| 4,188,141 | A | * | 2/1980 | Stoot | 403/24 |
| 4,550,890 | A | * | 11/1985 | Redman et al. | 248/59 |
| 4,653,792 | A | * | 3/1987 | Sword | 294/82.14 |
| 4,656,698 | A | * | 4/1987 | Arakawa | 24/136 A |
| 4,828,210 | A | * | 5/1989 | Anderson et al. | 248/229.15 |
| 4,984,337 | A | * | 1/1991 | Tallman | 24/16 R |
| 4,988,070 | A | * | 1/1991 | Hollinger et al. | 248/613 |
| D332,562 | S | * | 1/1993 | Fremont et al. | D8/73 |
| 5,314,202 | A | * | 5/1994 | Wilkins, Jr. | 280/511 |
| 5,417,400 | A | * | 5/1995 | Arakawa | 248/323 |
| 5,704,669 | A | * | 1/1998 | Clark | 294/19.1 |
| 6,032,907 | A | * | 3/2000 | Santa Cruz et al. | 248/60 |
| 2002/0066710 | A1 | * | 6/2002 | Spitsbergen | 212/179 |

* cited by examiner

Primary Examiner—Korie Chan
(74) Attorney, Agent, or Firm—Paul A. Beck & Associates, P.C.

(57) ABSTRACT

Cable Support Systems for supporting an object at a desired distance below an overhead beam or other overhead structure are provided. Novel clamps for clamping to the overhead structure are fitted to support cables that encircle objects to be supported by the cable support systems. The novel clamps have internal methods to support the cables. The cables are then encircled around the objects and fixed relative to the clamp. The distances between the object and the clamps may be precisely controlled.

9 Claims, 9 Drawing Sheets

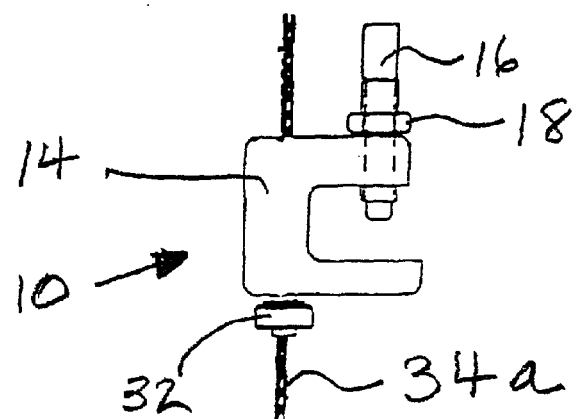
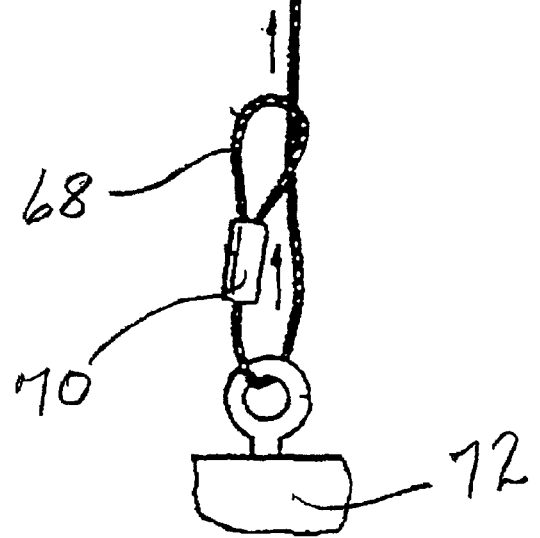
FIG. 9

CABLE SUPPORT SYSTEMS

BACKGROUND OF THE INVENTION

1. Field of the Invention

This invention relates generally to cable support systems for suspending an object from an overhead structure by means of cables. The cable support systems include novel clamps that clamp to the overhead structure and support the cable that suspends from them to secure the object to be suspended.

2. Prior Art

Various cable support systems have been described and utilized in the prior art to suspend objects from overhead beams. The purposed of such systems is to suspend items such as conduit, heating and air conditioning ducts, piping, and other objects from overhead structures such as beams or roofs. The earlier cable suspension systems did not provide adequate methods of adjusting the height of the objects suspended precisely so as to equalize the weight on several cables that might be suspending the same object. Further, the earlier systems did not provide a simple and easy way of connecting the cables that suspend an object to the overhead structures. The present invention provides a cable system that may precisely control the height of an object suspended from an overhead structure and also form a ready and easy connection to the overhead structure by novel clamps.

BRIEF SUMMARY OF THE INVENTION

A clamp for a cable support system is provided that includes a generally "C" shaped clamp body with a threaded fastener threadingly received within one leg of the "C" shaped body to clamp the "C" shaped body onto an overhead beam. A vertical bore through the clamp body receives a cable to be suspended from the overhead beam and there are various devices within the clamp body to restrict the downward vertical movement of the cable relative to the clamp body. One of the arrangements for restricting the downward movement of the cable within the clamp body is to provide a annular shoulder within the bore that cooperates with an oversized end portion on the cable and thereby restricts downward movement of the cable.

Another arrangement for restraining the cable within the "C" shaped body of the clamp includes providing a conical end portion at the lower part of the vertical bore through the body. A wedge retainer is movable vertically within the bore. Wedges retained by the wedge retainer contact the cable within the bore and force the wedges against the cable by contact with the conical end portion of the bore when the retainer is at the lower part of the bore. A spring urges the wedge retainer downwardly relative to the bore so that when the cable is forced upwardly through the wedges, the cable is restricted from downward movement.

Still another arrangement for restraining the cable within the "C" shaped body of the clamp includes providing a passage extending downwardly at an acute angle to the vertical bore with a wedge within the passage that is urged into the bore by a spring. The wedge prevents the cable from moving downwardly unless it is released by release levers that extend out from the wedge through slots in the "C" shaped body.

Cable support systems are also provided which utilize the novel clamps and suspend an object from the cable with the use of cable clamps or by providing fixed loops at the end of the cable to secure an object to the cable.

Accordingly, it is an object of the present invention to provide a novel clamp for securing a cable to an overhead beam.

Another object of the present invention is to provide systems for securing objects to overhead beams which permit the height to be precisely regulated.

Another object of the present invention is to provide a system for securing an object to an overhead beam by means of suspension cables that is readily installable by workmen.

These and other objects of the present invention all become readily apparent as this description proceeds in conjunction with the accompanying drawings.

BRIEF DESCRIPTION OF THE DRAWINGS

FIG. 9 is a system similar to that of FIG. 6.

DETAILED DESCRIPTION OF THE PREFERRED EMBODIMENTS

Figure 1:
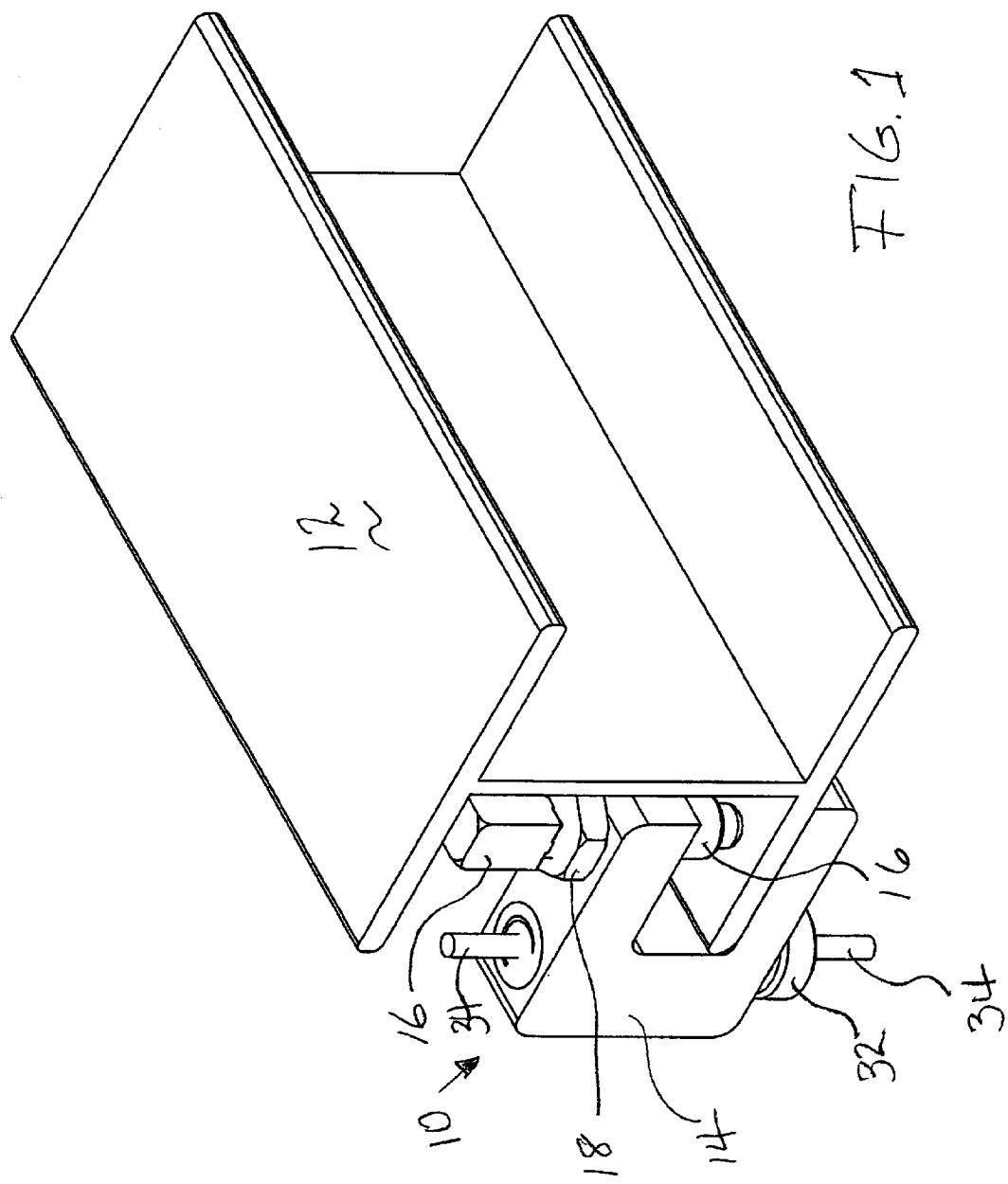
FIG. 1 is a perspective view of one embodiment of the clamp of the present invention clamped to a section of "I" beam.
Figure 2:
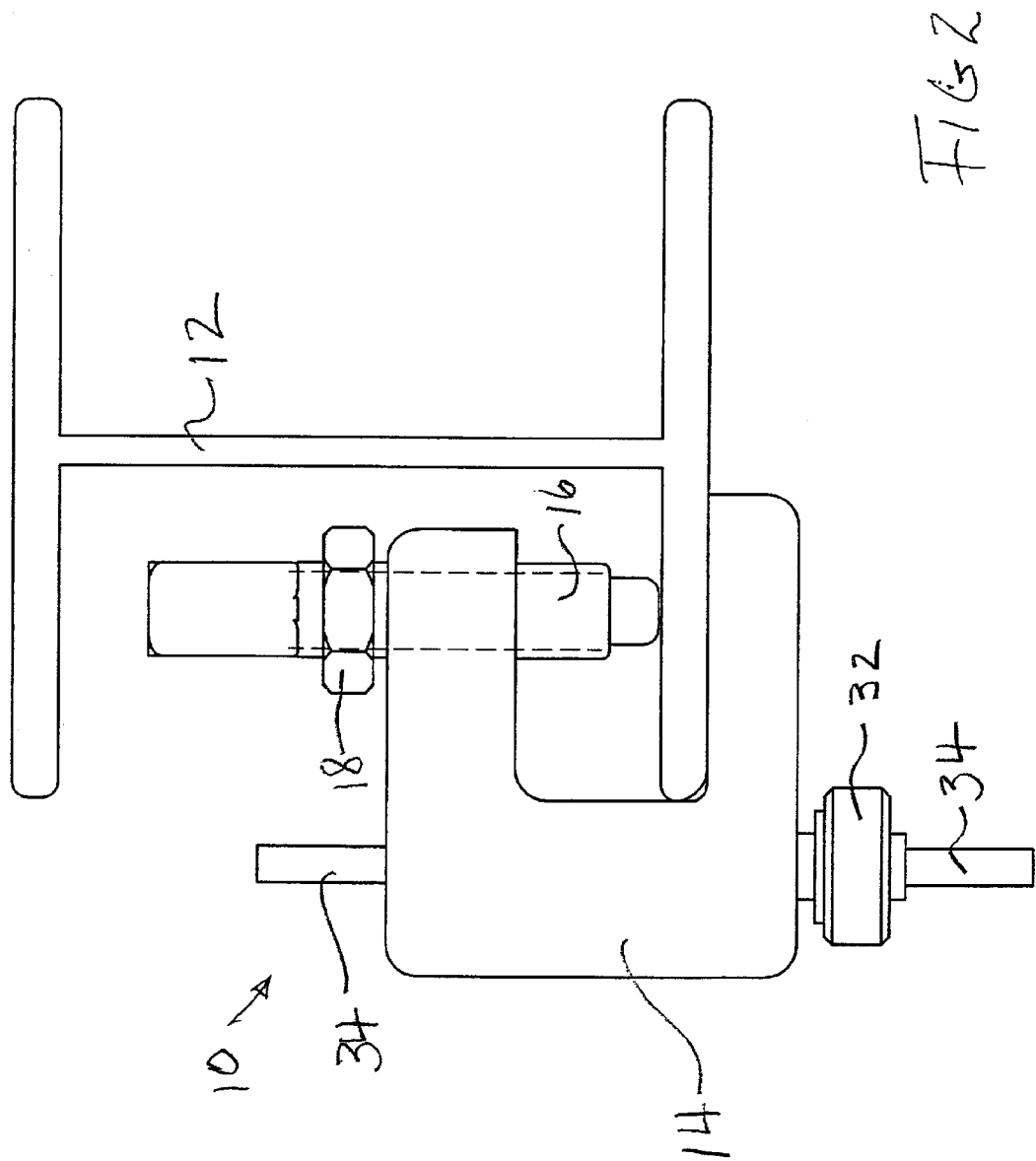
FIG. 2 is an elevational view of the clamp of FIG. 1 clamped to the "I" beam.
Figure 3:
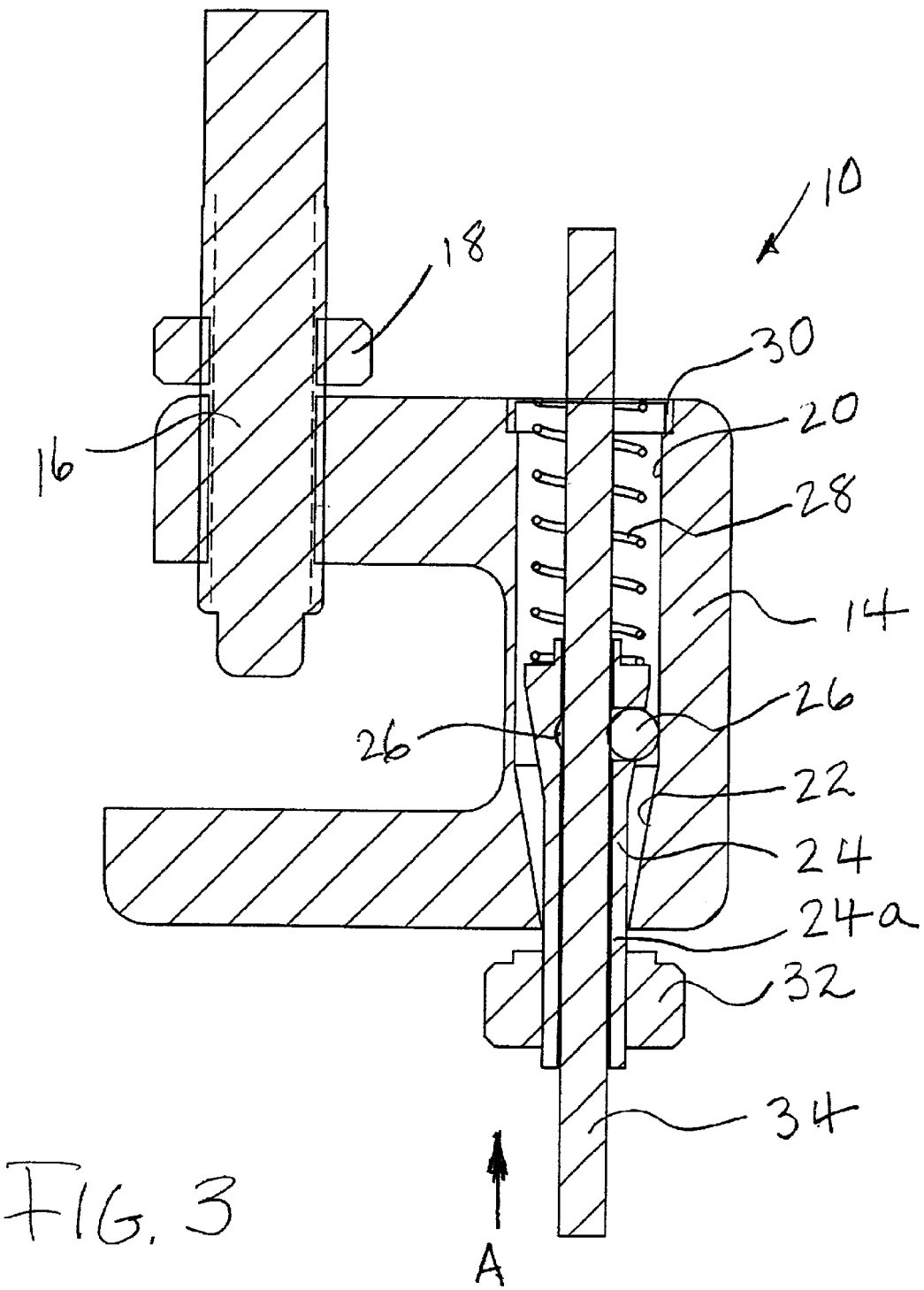
FIG. 3 is a sectional elevation of the clamp of FIGS. 1 and 2 showing the internal arrangement of the clamp.

Referring to FIGS. 1–3, there is shown a clamp generally indicated at 10 clamped to an overhead beam 12. The overhead beam 12 is depicted as an "I" beam but it could be a beam or support of any shape that would accept the clamp 10. The clamp 10 has a generally "C" shaped body 14 with a threaded fastener 16 threaded through one leg of the "C" shaped body 14. A lock nut 18 is included on the threaded fastener 16 to lock the fastener in place after the clamp 10 is secured to beam 12. A vertical bore 20 (FIG. 3) is provided through the body 14 of clamp 10. The vertical bore 20 has a conical end 22 at the lower end of the clamp 10. Within the vertical bore 20 is positioned a wedge retainer 24 which is generally conical in shape with an extended cylindrical end portion 24a and which has a bore extending through the length of the wedge retainer 24 to accept a cable. The wedge retainer 24 retains wedges 26 about its periphery. The wedges 26 are depicted as balls but they could also be wedges of other shapes without departing from the spirit of this invention. The wedge retainer 24 is urged downwardly relative to the clamp body 14 by a spiral spring 28 that is secured at the upper end of the body 14 by a spring cap 30 fixed to the body 14.

A retainer lock nut 32 is threaded onto the outer extension of the wedge retainer 24 for a purpose to be described. A cable 34 is positioned within the body 14 of clamp 10. The cable 34 may be moved upwardly in the direction shown by the arrow A in FIG. 3. If cable 34 is attempted to be moved downwardly against the direction of arrow A, the wedges 26 within the wedge retainer 24 are wedged against the cable as the wedge retainer 24 moves downwardly and the wedges 26 enter the lower conical portion 22 of vertical bore 20. It will be seen that the position of the cable 34 relative to the clamp body 14 may be adjusted by moving the cable 34 upwardly in the direction of arrow A. Once the cable 34 is positioned in the desired location, the retainer lock nut 32 is threaded upwardly against the body 14 of clamp 10 to prevent movement of the wedge retainer 24 relative to the body 14 and thereby lock the cable 34 in place.

Figure 4:
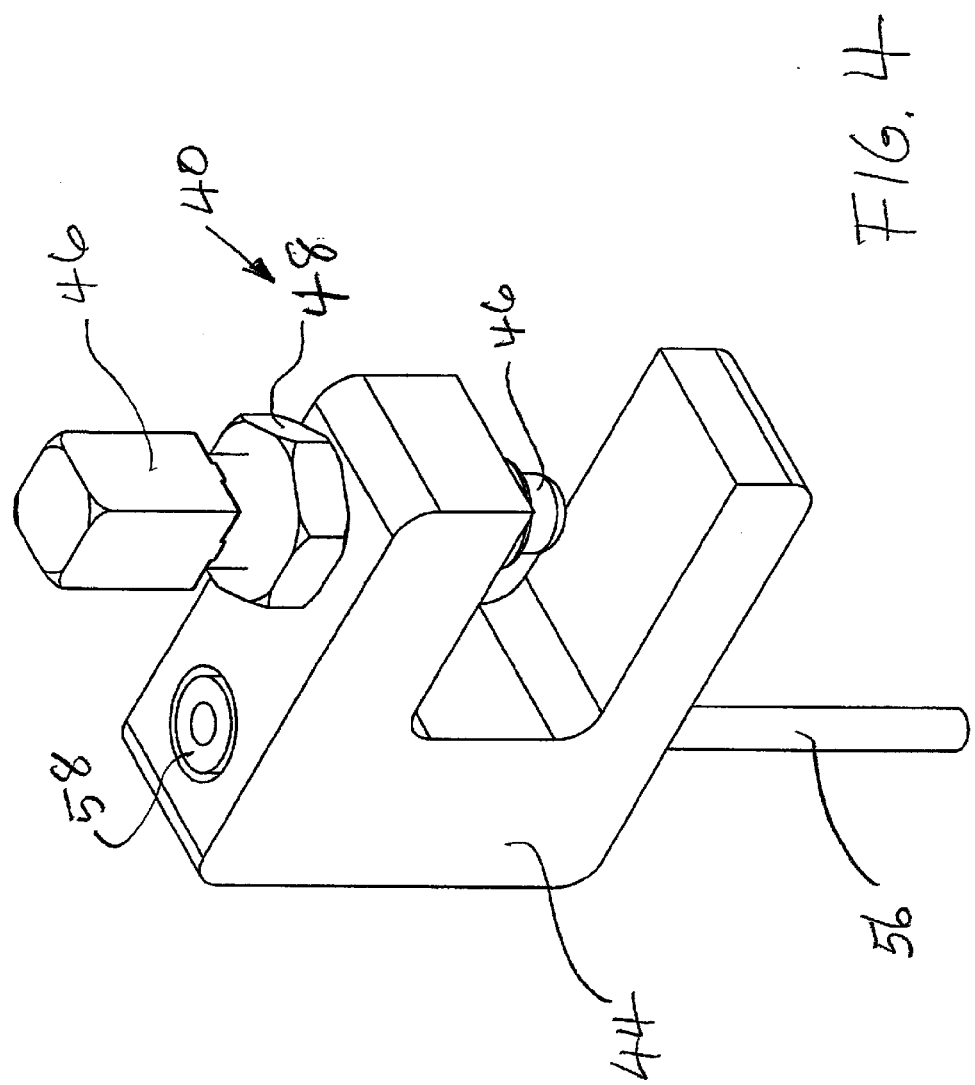
FIG. 4 is a perspective view of a clamp similar to that of FIG. 1.
Figure 5:
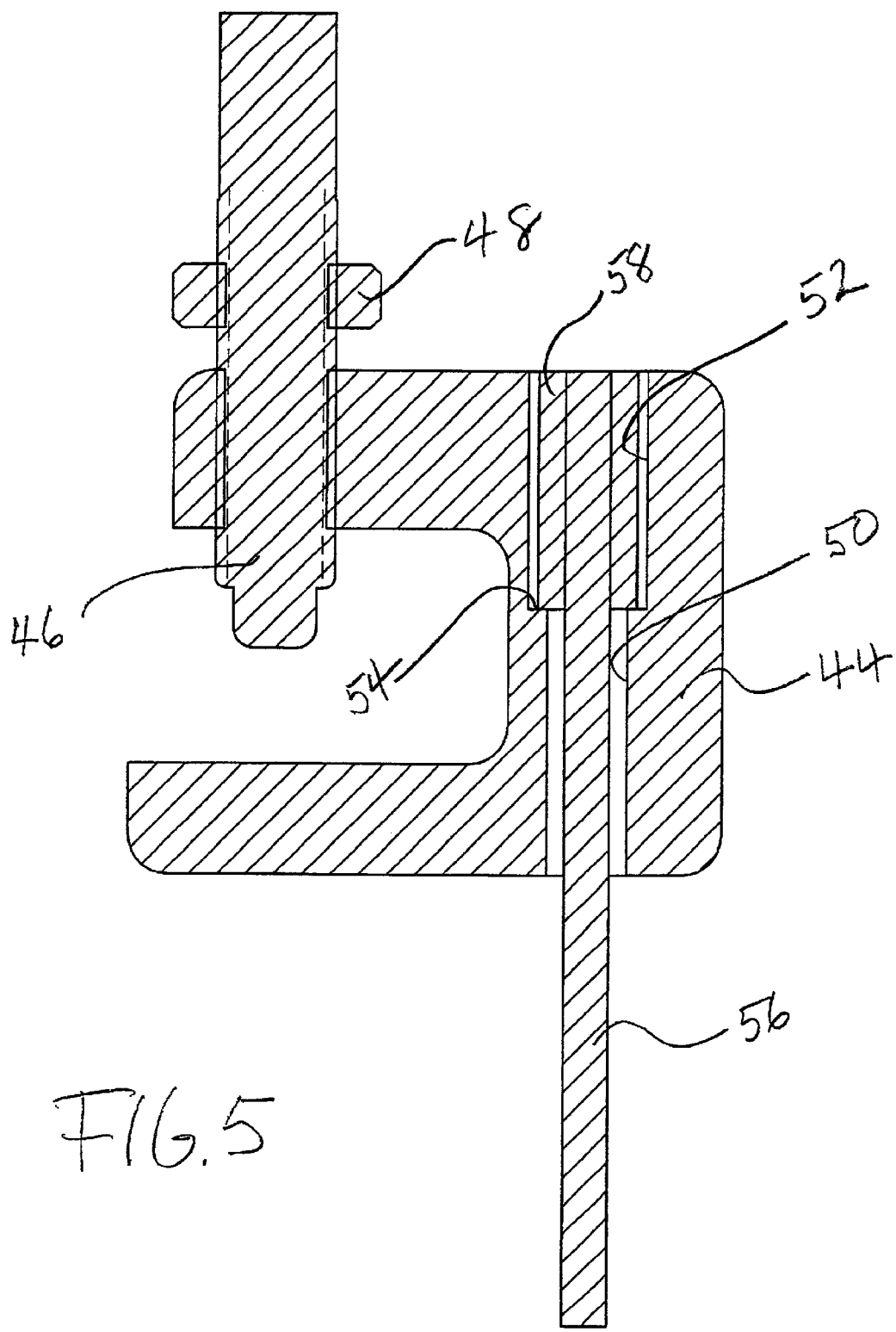
FIG. 5 is a sectional elevation of the clamp of FIG. 4.

Referring to FIGS. 4 and 5, there is shown a second embodiment of a clamp adapted to fix a cable to an overhead beam. The clamp shown generally at 40 has a generally "C" shaped body 44 with a threaded fastener 46 threaded through one leg of the body 44. A lock nut 48 is positioned on the threaded fastener 46 to lock it in place once the threaded fastener 46 clamps the body 44 of clamp 10 onto an overhead beam (not shown). Referring to FIG. 5, there is shown a vertical bore 50 that has an oversized portion 52 at the top of the body of clamp 10. The oversized portion 52 forms an annular shoulder 54 around the top of the smaller vertical bore 50. A cable 56 is shown within the vertical bore 50 and cable 56 has an oversized end 58 which prevents the cable 56 from moving downwardly relative to the clamp body 44 when the oversized end 58 contacts the annular shoulder 54 within the clamp body 44.

Figures 6, 7:
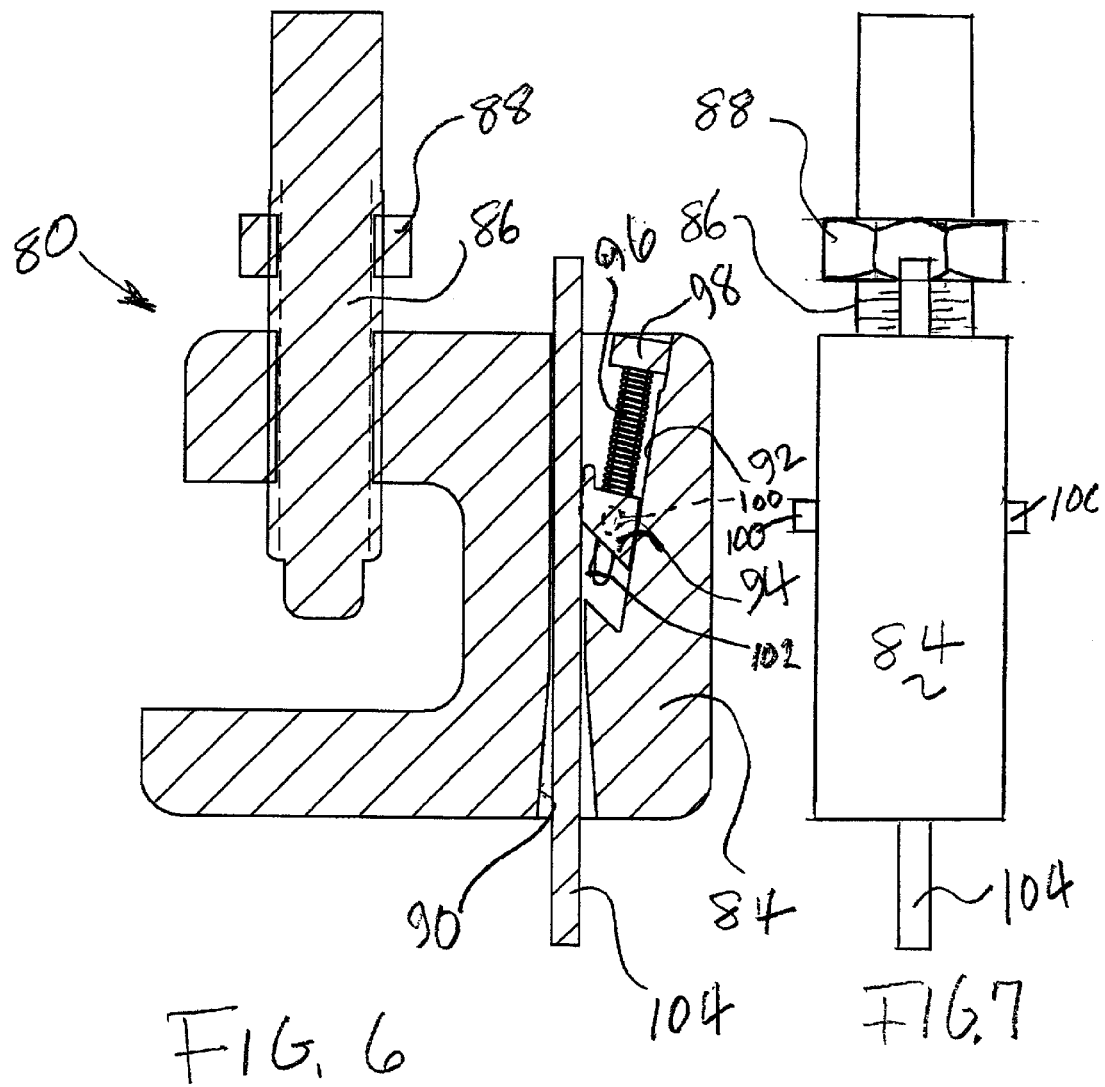
FIG. 6 is a sectional elevation of another form of clamp.
FIG. 7 is an end elevation of the clamp of FIG. 6.

Referring to FIGS. 6 and 7, there is shown a third embodiment of a clamp adapted to fix a cable to an overhead beam. The clamp shown generally at 80 has a generally "C" shaped body 84 with a threaded fastener 86 through one leg of the body 84. A lock nut 88 is positioned on the threaded fastener 86 to lock it in place once the threaded fastener 86 clamps the body 84 of clamp 10 onto an overhead beam (not shown). A vertical bore 90 is provided through the body 84 of clamp 80.

The vertical bore 90 has a passage 92 communicating with it. Passage 92 extends downwardly at an acute angle to bore 90 and contains a wedge 94 that slides within passage 92. The wedge 94 is urged toward bore 90 by a spring 96 that is retained by a spring cap 98 fixed to the upper end of passage 92. The wedge 94 has release levers 100 fixed to it that extend outwardly from wedge 94 through slots 102 formed into each side of "C" shaped body 84. The slots 102 extend generally parallel to passage 92 and permit the wedge 94 to be moved against the urging of spring 96.

It will be seen that cable 104 can be inserted upwardly into bore 90 and that the wedge 94 will move against the urging of spring 96 to permit passage of cable 104. If there is an attempt to move cable 104 downwardly, it will be wedged against bore 90 by wedge 94. If it is desired to move cable 104 downwardly, release levers 100 are moved against the urging of spring 96 to move wedge 94 away from cable 104.

Figure 8:
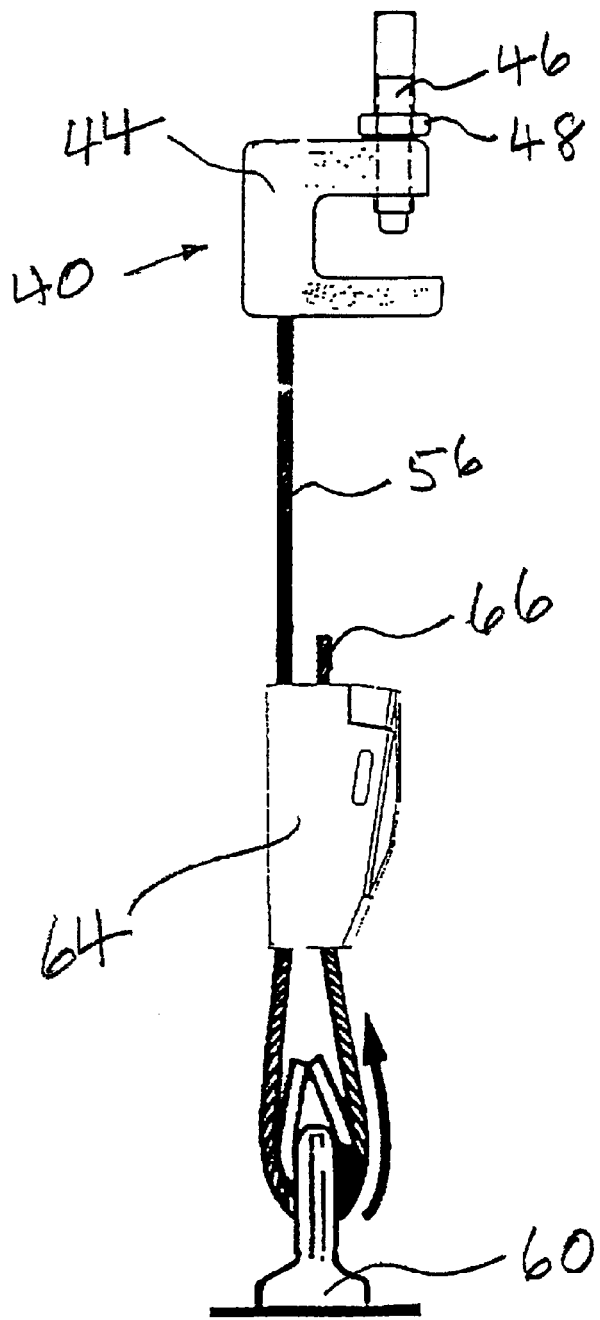
FIG. 8 is a system for suspending an object from an overhead beam shown schematically.
Figure 10:
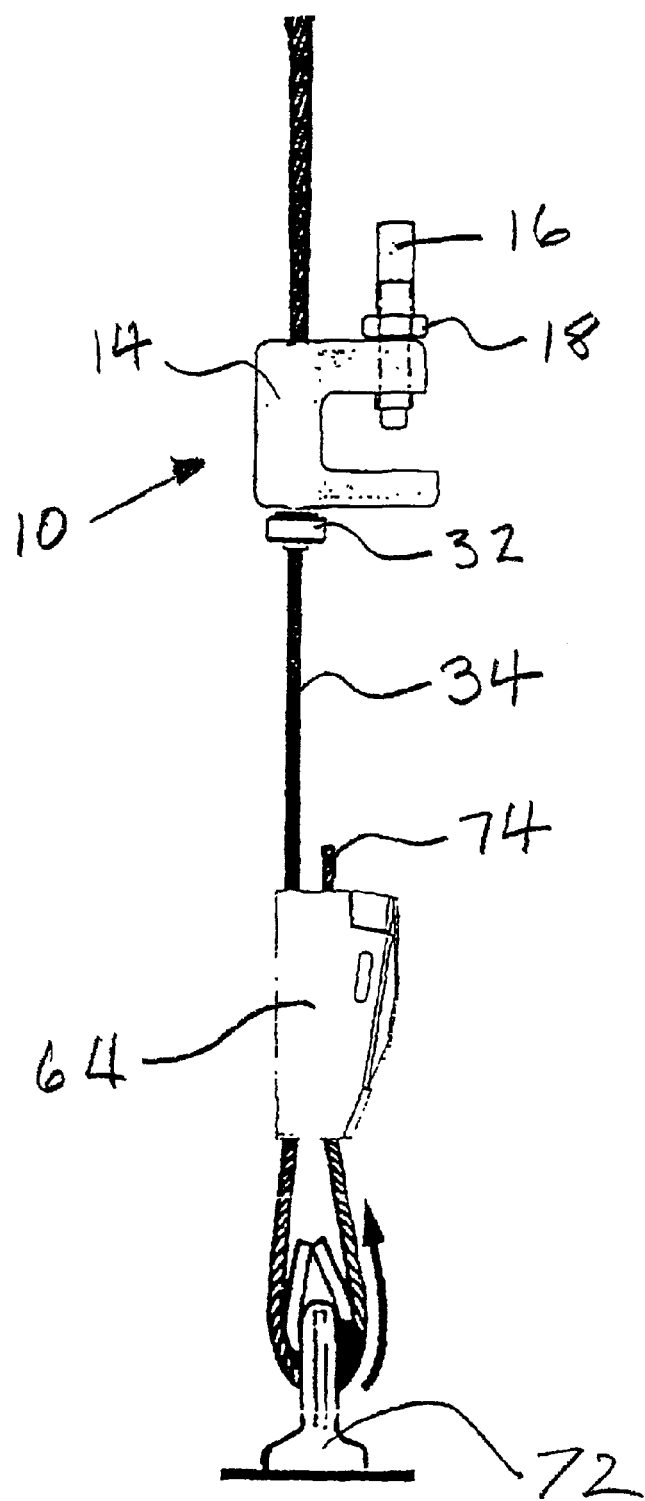
FIG. 10 is another system similar to those of FIGS. 6 and 7.

FIGS. 8, 9, and 10 show systems for supporting objects below overhead beams by means of cable supported from the novel clamps shown in FIGS. 1–7. FIG. 8 shows a clamp 40 having the "C" shaped body 44 with the threaded fastener 46 and lock nut 48 clamped to an overhead beam (not shown). The cable 56 that suspends from clamp 40 is utilized to support an object 60 at a desired distance below the clamp 40. The object 60 as shown in FIG. 6 has an eye through which cable 56 passes. It should be understood that the shape and size of object 60 form no part of the present invention and the object 16 may be a pipe, a heating or air conditioning vent, or any other object which is encircled by cable 56.

As shown in FIG. 8, the cable 56 passes through a cable grip 64 and then encircles the object 60 and is returned back through cable grip 64 where the free end 66 of cable 56 protrudes above the cable grip 64.

The cable grip 64 is a device shown and described in my copending patent application Ser. No. 10/029,087 entitled "Releasable Cable Grip" and filed in the United States Patent and Trademark Office on Dec. 20, 2001. The cable grip 64 consists generally of a housing that has twin bores through the housing. One bore permits the cable to pass freely through the housing without being restricted. The other bore contains wedges and retainer elements that permit the cable to pass in only one direction through the housing and restrict the cable from being removed from the housing in the opposite direction. As shown in FIG. 6, the cable 56 suspends from the clamp 40 and passes through the passage within cable grip 64 which does not restrict it. The cable 56 is passed around object 60 and is then passed upwardly through cable grip 64 until the end portion 66 of the cable 56 protrudes above the cable grip 64. The precise height of object 60 relative to clamp 40 will depend upon the amount of the free end 66 of cable 56 that extends above the cable grip 64.

Referring to FIG. 9, the clamp 10 of the type shown in FIGS. 1–3 is attached to an overhead beam (not shown) when the threaded fastener 16 in the clamp body 14 is threaded against the beam and the lock nut 18 is secured. In clamp 10, the retainer lock nut 32 will hold the cable 34a in place. In the embodiment of FIG. 9, the cable 34a has a permanent loop 68 formed on the end of cable 34a by means of a crimped retainer 70 that secures the end of cable 34a and forms the loop 68. In FIG. 9, the object 72 is encircled by cable 34a and then cable 34a passes back through its own loop 68 to secure the object. The cable 34a is then passed upwardly into clamp 10 with the retainer lock nut 32 loosened to permit free movement of cable 34a through the clamp body 14. The height of object 72 relative to clamp 10 is adjusted by adjusting the amount of cable 34a that protrudes above the body 14 of the clamp 10. It will be appreciated that the system of FIG. 9 may also be practiced with the clamp 80 of FIGS. 6 and 7 since the amount of cable protruding above clamp 80 is adjustable.

FIG. 10 also shows a system which utilizes the clamp 10 of FIGS. 1–3. Here again, a cable 34 is secured by clamp 14 as described in conjunction with the description of clamp 10. The cable 34 passes through a cable grip 64 as described in conjunction with the configuration of FIG. 8 herein. The cable 34 passes through the free passage of cable grip 64, encircles the object to be retained, and then passes back up through the restrained passage of cable grip 64 so that the free end 74 of cable 34 extends above the cable grip 64. In the configuration of FIG. 10, the height of object 72 relative to clamp 10 may be adjusted by the amount of cable that is moved above clamp 10 by loosening retainer lock nut 32 and thereafter tightening it. The height of object 72 relative to clamp 10 may also be adjusted by the amount of the free end 74 of cable 34 that is permitted to protrude above the cable grip 64. Thus FIG. 8 has two separate and distinct adjustment means for adjusting the height of the object 72 relative to the clamp 10. Again, it will be appreciated that the clamp 80 of FIGS. 6 and 7 may be substituted in this system of FIG. 10 since it operates in a manner similar to the clamp 10 of FIGS. 1–3.

In accordance with the provisions of the patent statutes, I have described the principle, mode of operation and the preferred embodiments of my invention. It should be understood that the invention may be practiced otherwise than as specifically illustrated and described herein in accordance with the claims affixed hereto.

I claim:

1. A clamp for a cable support system to suspend an object from an overhead beam comprising:
   a generally "C" shaped clamp body;
   a threaded fastener threadingly received within one leg of said "C" shaped body to clamp said "C" shaped body onto said overhead beam;
   a vertical bore through the vertical portion of the "C" of said clamp body for the purpose of receiving a cable to be suspended from said overhead beam;
   a conical end portion at the lower part of said bore;
   a wedge retainer vertically movable within said bore;
   wedges retained by said wedge retainer for the purpose of contacting a cable within said bore and to forced against said cable by said conical end portion of said bore when said retainer is at the lower part of said bore; and
   a spring urge said wedge retainer downwardly relative to said bore.

2. The clamp of claim 1 wherein the wedges release to permit upward movement of a cable relative to said clamp when a cable is inserted into the clamp and forced upwardly.

3. The clamp of claim 2 wherein said wedge retainer has a threaded portion protruding below said bore with a lock nut threaded onto said wedge retainer lower portion so that after a cable is positioned within said clamp "C" shaped body at the desired height, said lock nut is tightened against said clamp "C" shaped body to lock said wedge retainer and prevent movement of said wedge retainer relative to said bore.

4. A cable support system for hanging an object at a desired distance below an overhead beam comprising:
   a cable;
   a clamp having a generally "C" shaped clamp body with a threaded fastener threadingly received within one leg of said "C" shaped body to clamp said "C" shaped body onto said overhead beam and a vertical bore through said clamp body to receive the cable to be suspended from said overhead beam, said vertical bore having a conical lower end portion with a wedge retainer and wedges vertically movable within said bore whereby said wedges contact said lower conical end portion and said cable to wedge said cable into position within said bore, the vertical position of said cable relative to said bore being vertically adjustable by forcing said cable upwardly to release said wedges;
   an object to be suspended by said cable at a predetermined height below said beam; and
   means for connecting said cable to said object.

5. The cable support system of claim 4 wherein said means for connecting said cable to said object includes:
   a permanent loop formed on the end of said cable; and
   passing said cable around said object and thereafter threading said cable through said permanent loop formed on the end of said cable and thereafter threading said cable into said vertical bore in said clamp.

6. The cable support system of claim 5 wherein the height of said object below said beam is controlled by the amount of said cable threaded upwardly through said vertical bore in said clamp.

7. The cable support system of claim 6 wherein said clamp wedge retainer has a threaded portion protruding below said bore with a lock nut threaded onto said wedge retainer lower portion so that after said cable is positioned within said clamp "C" shaped body at the desired height, said lock nut is tightened against said clamp "C" shaped body to lock said wedge retainer and prevent movement of said wedge retainer relative to said bore.

8. The cable support system of claim 4 wherein said clamp vertical bore includes a spring that urges said wedge retainer downwardly relative to said bore.

9. The cable support system of claim 4 wherein said clamp wedge retainer has a threaded portion protruding below said bore with a lock nut threaded onto said wedge retainer lower portion.

* * * * *

UNITED STATES PATENT AND TRADEMARK OFFICE
CERTIFICATE OF CORRECTION

PATENT NO. : 7,073,754 B2  
APPLICATION NO. : 10/085543  
DATED : July 11, 2006  
INVENTOR(S) : Shuey It is certified that error appears in the above-identified patent and that said Letters Patent is hereby corrected as shown below:

Column 5, Line 7: cancel "onto said overhead beam" and insert --onto overhead beam--
Column 5, Line 14: cancel "within said bore and to forced against said cable" and insert --within said bore and to be forced against said cable--

Signed and Sealed this

Twelfth Day of December, 2006

JON W. DUDAS  
*Director of the United States Patent and Trademark Office*